UNITED STATES PATENT OFFICE.

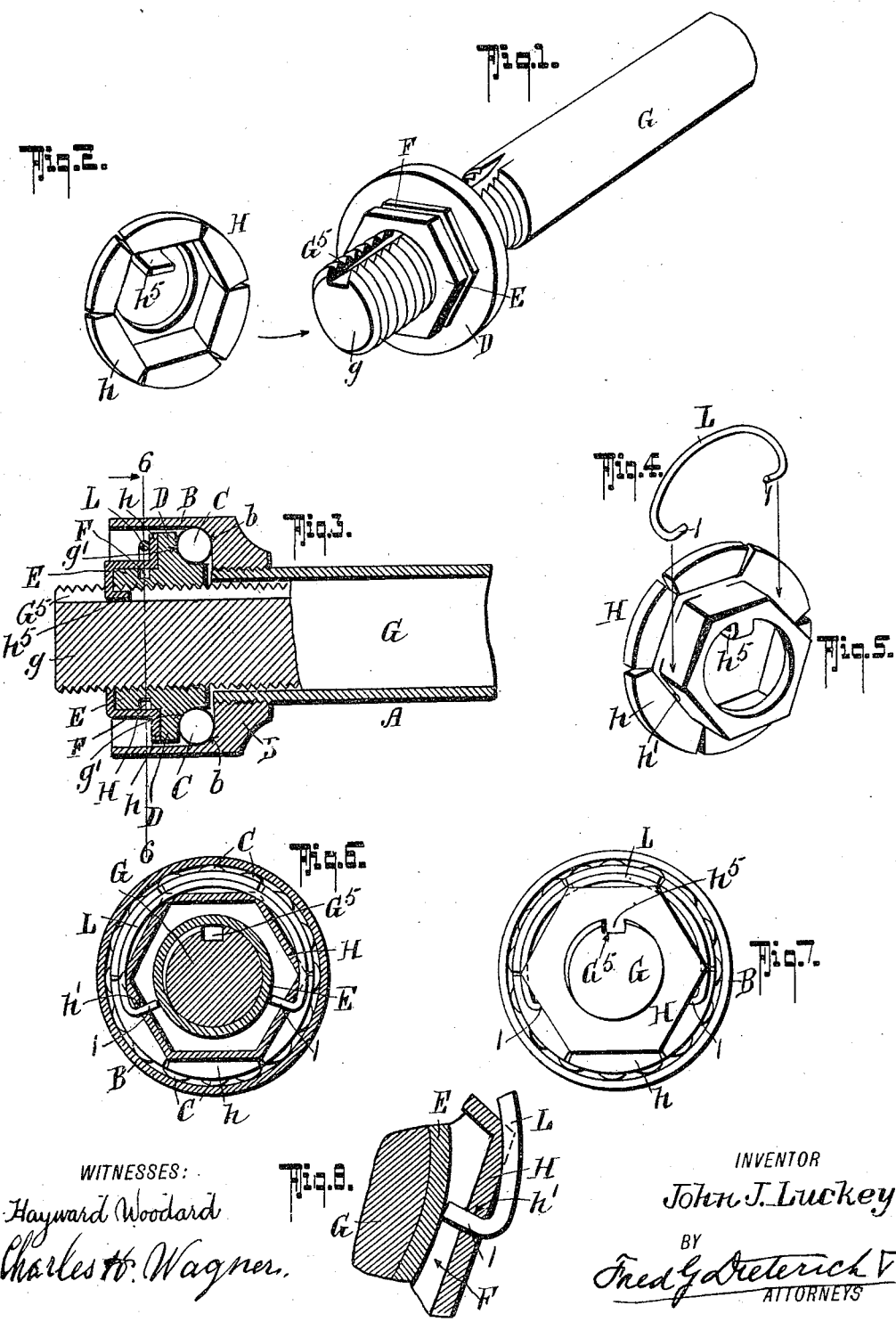

JOHN J. LUCKEY, OF HOOD RIVER, OREGON.

CONE-LOCK FOR BALL-BEARINGS.

950,071. Specification of Letters Patent. Patented Feb. 22, 1910.

Application filed May 13, 1909. Serial No. 495,652.

*To all whom it may concern:*

Be it known that I, JOHN J. LUCKEY, residing at Hood River, in the county of Wasco and State of Oregon, have invented a new and Improved Cone-Lock for Ball-Bearings, of which the following is a specification.

My present invention relates to improvement in that type of nut and lock devices used in connection with cone bearings and of that general form shown in my Patent No. 890,566 dated June 9, 1908, and it has for its object to provide a more simplified arrangement of parts, adapted to be more economically manufactured and in which the adjustment can be quickly made and when the parts are locked a positive and effective locking of the balls to their bearings or raceways is effected.

My invention therefore consists in the peculiar arrangement and combination of parts hereinafter explained, specifically pointed out in the claim and illustrated in the accompanying drawings in which, Figure 1, is a perspective view of a part of my invention. Fig. 2, is a perspective view of the locking cap which coöperates therewith. Fig. 3, is a longitudinal section of my invention. Figs. 4 and 5, are detail views of a portion of my invention. Fig. 6, is a cross section on the line 6—6 of Fig. 3. Fig. 7, is a front elevation of a part shown in Fig. 3. Fig. 8, is an enlarged detail view hereinafter referred to.

In carrying out my present invention, the axle G is mounted within the box A which in practice is drawn into the wheel hub in the ordinary manner, and B is the usual cup that threads onto the member A and has a ball bearing or race face $b$ with which engage the antifriction balls C as shown in Fig. 3, by reference to which it will be noticed the cone D engages the threaded end $g$ of the axle G and it has the other bearing or race face $g'$ for engaging the balls C.

The cone bearing or lock member has an outwardly projected reduced tubular extension that has an annular groove F and an angular head E, the purpose of which is to receive a locking cap H that is polygonally shaped to snugly fit over the angular head E and the said cap H has a flange $h$ to rest against the cone nut D and at opposite sides it has small apertures $h'$ for receiving the ends of a clip spring L, which is of substantially semi-circular shape and has its ends turned inwardly to form angular fingers $l$ adapted to slip through the apertures $h'$ and enter the annular groove F in the member D, it being understood that by fitting the fingers $l$—$l$ into the apertures $h'$—$h'$ and into the groove F and springing the clip L over the polygonal cap H the same will become permanently held against working off the cone nut D. To hold the cone nut D and also the cap H from working off the threaded bolt, the said bolt is formed with a longitudinal groove $G^5$ for receiving an inturned lip or flange $h^5$ formed on the cap H.

From the foregoing description taken in connection with the accompanying drawings, the advantages and the manner in which all the parts are assembled and coöperate, will be readily understood.

It will be noticed the cone nut can be easily screwed home after which the cap H is fitted thereon with its locking lip in the groove in the bolt which keeps the cone nut from turning on the screw, the cap being locked on the cone nut by the wire spring clip, as shown.

Having thus described my invention what I claim and desire to secure by Letters Patent is:—

In a device of the character described, the combination with an axle provided with a longitudinally extending groove; of a cone threaded thereon, said cone having a tubular projection formed with an angular head and having an annular groove, a cap shaped to snugly slip over the angular head and having a projecting member for slidably engaging the axle groove, said cap having a pair of oppositely disposed apertures, a spring wire keeper adapted for fitting over the cap member its ends terminating in inturned fingers to fit through the apertures in the cap and into the annular groove on the cone extension.

JOHN J. LUCKEY.

Witnesses:
J. H. MIDDLETON,
MARJORIE HENDERSON.